(12) United States Patent
Koui

(10) Patent No.: US 9,691,415 B2
(45) Date of Patent: Jun. 27, 2017

(54) MEASUREMENT CIRCUIT FOR MICROWAVE ASSISTED MAGNETIC RECORDING

(71) Applicant: Kabushiki Kaisha Toshiba, Minato-ku, Tokyo (JP)

(72) Inventor: Katsuhiko Koui, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/041,585

(22) Filed: Feb. 11, 2016

(65) Prior Publication Data

US 2017/0140779 A1    May 18, 2017

(30) Foreign Application Priority Data

Nov. 13, 2015  (JP) .................................. 2015-223346

(51) Int. Cl.
| G11B 11/00 | (2006.01) |
| G11B 5/09 | (2006.01) |
| G11B 5/39 | (2006.01) |
| G11B 20/18 | (2006.01) |
| G11B 5/00 | (2006.01) |
| G11B 15/02 | (2006.01) |
| G11B 19/02 | (2006.01) |
| G11B 5/60 | (2006.01) |

(52) U.S. Cl.
CPC .............. *G11B 5/09* (2013.01); *G11B 5/3912* (2013.01); *G11B 20/18* (2013.01); *G11B 5/6088* (2013.01); *G11B 15/02* (2013.01); *G11B 19/02* (2013.01); *G11B 2005/0021* (2013.01); *G11B 2005/0024* (2013.01)

(58) Field of Classification Search
None
See application file for complete search history.

(56) References Cited

U.S. PATENT DOCUMENTS

| 7,667,933 | B2 | 2/2010 | Kudo et al. | |
| 8,896,947 | B2 | 11/2014 | Koizumi et al. | |
| 8,896,973 | B2 | 11/2014 | Nagasawa et al. | |
| 8,953,273 | B1 * | 2/2015 | Funayama | G11B 5/012 |
| | | | | 360/46 |
| 9,111,552 | B1 * | 8/2015 | Takeo | G11B 5/127 |
| 9,117,474 | B1 * | 8/2015 | Contreras | G11B 5/6005 |
| 9,311,934 | B1 * | 4/2016 | Shiimoto | G11B 5/147 |
| 2008/0268291 | A1 * | 10/2008 | Akiyama | G11B 5/02 |
| | | | | 428/812 |
| 2012/0113542 | A1 * | 5/2012 | Igarashi | G11B 5/3116 |
| | | | | 360/75 |
| 2013/0050865 | A1 * | 2/2013 | Katada | G11B 5/1278 |
| | | | | 360/31 |

(Continued)

*Primary Examiner* — Tan X Dinh
(74) *Attorney, Agent, or Firm* — White & Case LLP

(57) ABSTRACT

According to one embodiment, a disk device includes a disk includes a recording layer, a recording head includes a main pole configured to apply a recording magnetic field onto the recording layer, and a microwave oscillator adjacent to the main pole, configured to apply a microwave magnetic field to the recording layer, a current supply circuit configured to supply a current to the microwave oscillator, and a switching circuit configured to switch a direction of current flow to the microwave oscillator.

7 Claims, 8 Drawing Sheets

(56) References Cited

U.S. PATENT DOCUMENTS

| | | | | |
|---|---|---|---|---|
| 2013/0070367 A1* | 3/2013 | Igarashi | ............... | G11B 5/1278 360/75 |
| 2013/0229895 A1* | 9/2013 | Shiroishi | .............. | G11B 5/1278 369/13.14 |
| 2016/0148627 A1* | 5/2016 | Nagasaka | .............. | G11B 5/314 360/123.05 |
| 2016/0180867 A1* | 6/2016 | Takagishi | ................. | G11B 5/09 360/39 |

* cited by examiner

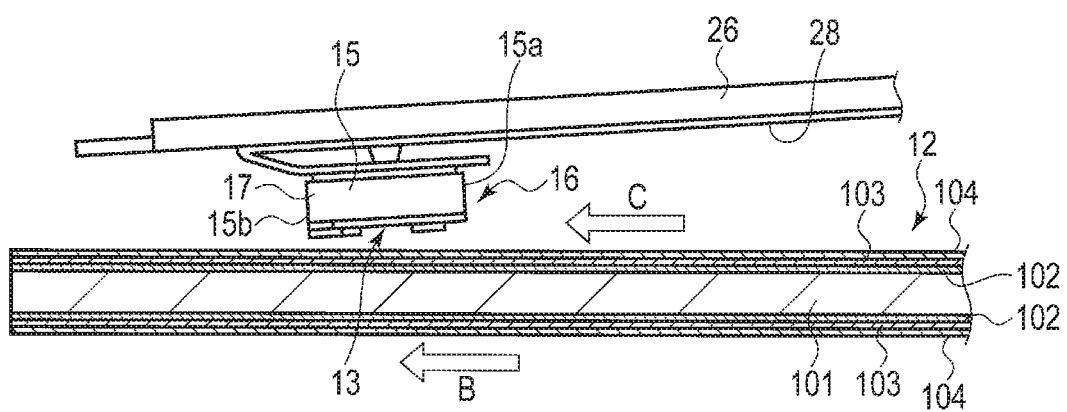
F I G. 2

MEASUREMENT CIRCUIT FOR MICROWAVE ASSISTED MAGNETIC RECORDING

CROSS-REFERENCE TO RELATED APPLICATIONS

This application is based upon and claims the benefit of priority from Japanese Patent Application No. 2015-223346, filed Nov. 13, 2015, the entire contents of which are incorporated herein by reference.

FIELD

Embodiments described herein relate generally to a disk device using a recording head comprising a microwave oscillator, and a method of driving the recording head.

BACKGROUND

In recent years, there has been proposed a microwave-assist magnetic recording head in which a spin torque oscillator is provided as a microwave oscillator and a microwave magnetic field is applied to the magnetic recording layer of a magnetic disk from the spin torque oscillator when recording. For the spin torque oscillator used for microwave-assist recording, there are proposed an asymmetrical type which combines a perpendicular film and a soft magnetic layer, and a symmetrical type which oscillates in optical mode by combining two equivalent soft magnetism layers.

However, some symmetrical spin torque oscillators may be asymmetrical because of variation in processing during manufacture. Depending on such variation, the oscillating efficiency of the spin torque oscillator may decrease.

BRIEF DESCRIPTION OF THE DRAWINGS

FIG. 2 is a side view illustrating a magnetic head, a suspension and a recording medium of the HDD.

DETAILED DESCRIPTION

Figure 1:
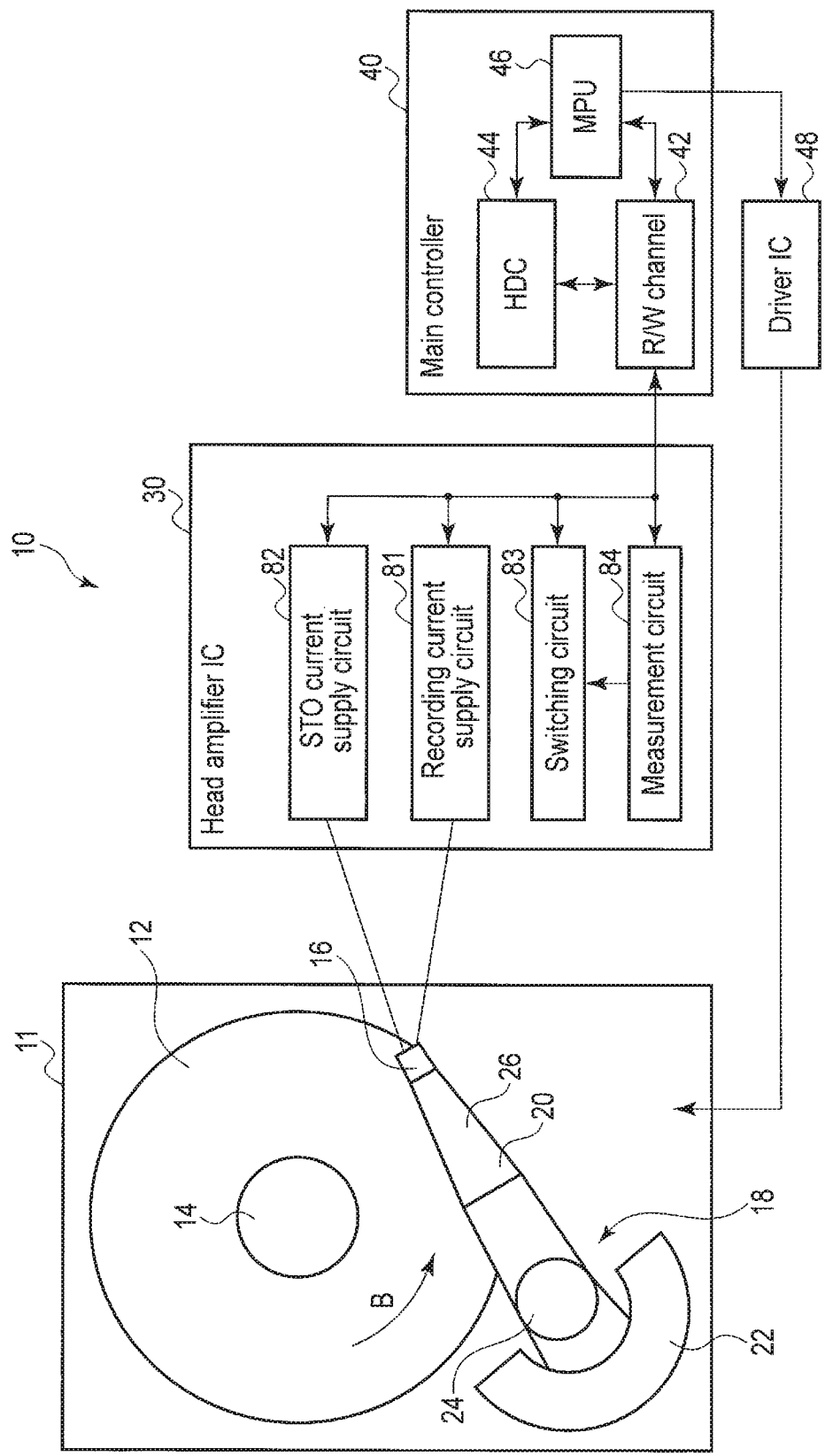
FIG. 1 is a block diagram schematically illustrating a magnetic disk drive (HDD) according to a first embodiment.

Various embodiments will be described hereinafter with reference to the accompanying drawings.

In general, according to one embodiment, a disk device comprises a disk comprising a recording layer; a recording head comprising a main pole configured to apply a recording magnetic field onto the recording layer, and a microwave oscillator adjacent to the main pole, configured to apply a microwave magnetic field to the recording layer; a current supply circuit configured to supply a current to the microwave oscillator; and a switching circuit configured to switch a direction of current flow to the microwave oscillator.

What are disclosed in this specification are merely examples. Appropriate modifications which can be easily conceived by a person ordinarily skilled in the art without departing from the spirit of the embodiments naturally fall within the scope of the present invention. To further clarify explanation, for example, the width, thickness or shape of each structure may be schematically shown in the drawings compared with the actual forms. Note that the drawings are merely examples and do not limit the interpretation of the present invention. In the specification and drawings, elements which are identical to those of the already-mentioned figures are denoted by the same reference numbers. Thus, the detailed explanation of such elements may be omitted.

First Embodiment

FIG. 1 is a block diagram schematically illustrating a hard disk drive (HDD) according to a first embodiment. FIG. 2 is a side view illustrating a magnetic disk and a magnetic head in its flying state.

As shown in FIG. 1, an HDD 10 comprises a rectangular housing 11, magnetic disks 12 arranged as recording media in the housing 11, a spindle motor 14 supporting and rotating the magnetic disk 12, and a plurality of magnetic heads 16 configured to write/read data on/from the magnetic disks 12. The HDD 10 comprises a head actuator 18 configured to move each magnetic head 16 to above an arbitrary track on a magnetic disk 12 for positioning. The head actuator 18 comprises a suspension assembly 20 movably supporting the magnetic heads 16 and a voice coil motor (VCM) 22 for rotating the suspension assembly 20.

The HDD 10 comprises a head amplifier IC 30 and a main controller 40. The head amplifier IC 30 is provided on, for example, the suspension assembly 20 and is electrically connected to the magnetic heads 16. The main controller 40 is formed on a control circuit board (not shown) on the rear side of the housing 11. The main controller 40 comprises an R/W channel 42, a hard disk controller (HDC) 44, a microprocessor (MPU) 46 and a driver IC 48. The main controller 40 is electrically connected to the head amplifier IC 30 and connected to the VCM 22 and the spindle motor 14 through the driver IC 48. The HDD 10 can be connected to a host computer (not shown).

As shown in FIGS. 1 and 2, each magnetic disk 12 is constructed as a perpendicular magnetic recording medium. The magnetic disk 12 comprises, for example, a substrate 101 of a non-magnetic material and is shaped as a disk having a diameter of about 2.5 inches (6.35 cm). The substrate 101 has two surfaces. A soft magnetic layer 102 is formed on each of the surfaces as an underlayer, on which a magnetic recording layer 103 and a protective film 104 are successively stacked in this order as upper layers. The magnetic disks 12 are coaxially fitted to the hub of the spindle motor 14. The magnetic disks 12 are rotated by the spindle motor 14 at a predetermined rate in a direction of an arrow B.

The head actuator 18 comprises a bearing unit 24 rotatably mounted on the housing 11, and the suspension assembly 20 comprises a plurality of suspensions 26 extending from the bearing unit 24. As shown in FIG. 2, the magnetic heads 16 are separately supported by extended ends of the respective suspensions 26. The magnetic heads 16 are electrically connected through interconnecting members 28 provided on the suspension assembly 20 to the head amplifier IC 30.

Figure 3:
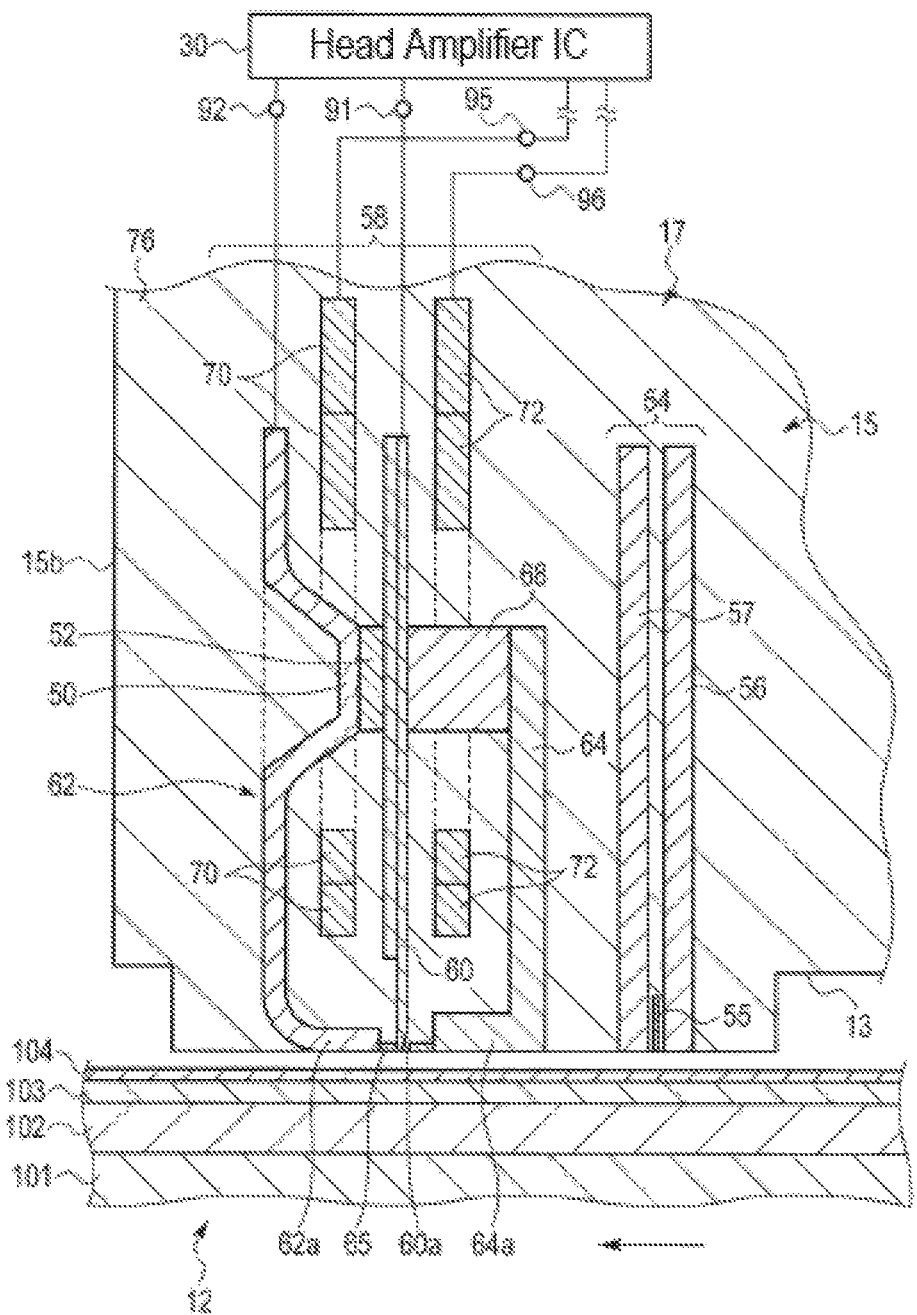
FIG. 3 is a partially enlarged cross section schematically illustrating a head section of the magnetic head and a magnetic disk.
Figure 4:
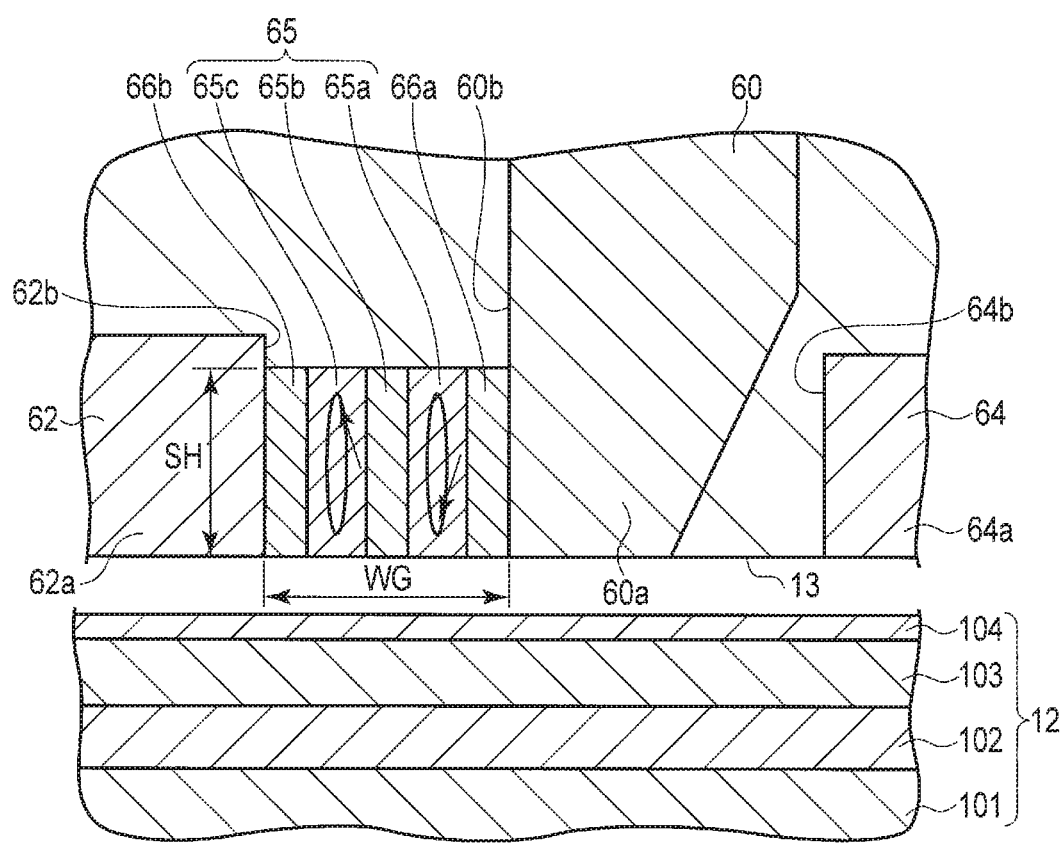
FIG. 4 is an enlarged cross section illustrating a distal end portion of the recording head and a spin torque oscillator (STO).
Figure 5:
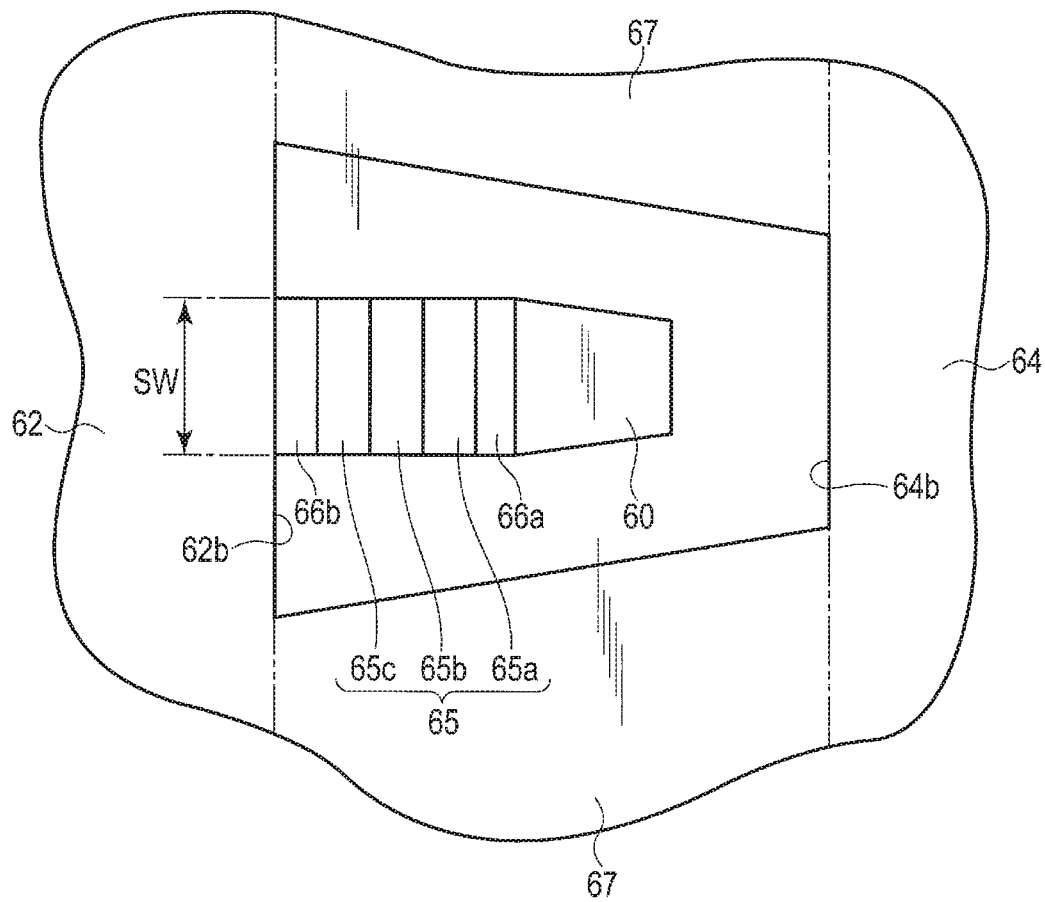
FIG. 5 is a plan view of the recording head as viewed from an air bearing surface side.

Next, the structure of the magnetic heads 16 will be explained in detail. FIG. 3 is a partially enlarged cross sectional view illustrating a head section of the magnetic head and the magnetic disk. FIG. 4 is a partially enlarged cross sectional view illustrating a distal end portion of the recording head and the magnetic disk. FIG. 5 is a plan view of the distal end portion of the recording head as viewed from an ABS side.

As shown in FIGS. 2 and 3, each of the magnetic heads 16 is constructed as a flying type head, and comprises a slider 15 shaped into substantially a rectangular parallelepiped and a head section 17 formed at an outflow (trailing) side end of the slider 15. The slider 15 is made from, for example, a sintered body of alumina and titanium carbide (AlTiC). The head section 17 is made of a plurality of thin film layers.

The slider 15 comprises a rectangular disk-facing surface (air bearing surface [ABS]) 13 facing the surface of the magnetic disk 12. The slider 15 is kept flying by a predetermined distance from the surface of the magnetic disk by airflow C produced between the disk surface and the ABS 13 by the rotation of the magnetic disk 12. The direction of the airflow C coincides with a direction of rotation B of the magnetic disk 12. The slider 15 comprises a leading end 15a located on a side in which the airflow C flows in and a trailing end 15b located on a side in which the airflow C flows out.

As shown in FIG. 3, the head section 17 is formed as a separate type magnetic head, which includes a read head 54 and a recording head 58, both formed by a thin-film process at the trailing edge 15b of the slider 15. The head section 17 also includes a spin torque oscillator (STO) 65 as a microwave oscillator.

The read head 54 comprises a magnetic film 55 exhibiting a magneto-resistive effect, shield films 56 and 57 disposed respectively on the trailing side and the leading side of the magnetic film 55 while interposing the magnetic film 55 therebetween. The magnetic film 55, the shielding films 56 and 57 are exposed to the ABS 13 of the slider 15 at their respective lower ends. The read head 54 is connected to the head amplifier IC 30 via an electrode, interconnecting portion, which are not shown, and the interconnecting member 28, and inputs the read data to the head amplifier IC.

The recording head 58 is provided on the side of the trailing end 15b of the slider 15 with respect to the read head 54. The recording head 58 comprises a main pole 60, a trailing shield (a write shield or a first shield) 62, and a leading shield (a second shield) 64. The main pole 60 is formed of a material having a high magnetic permeability, and produces a recording magnetic field perpendicular to the surface of the magnetic disk 12. The main pole 60 and the trailing shield 62 constitute a first magnetic core forming a first magnetic path. The main pole 60 and the leading shield 64 constitute a second magnetic core forming a second magnetic path. The recording head 58 comprises a first coil (a recording coil) 70 wound around the first magnetic core and a second coil (a recording coil) 72 wound around the second magnetic core.

As shown in FIG. 3 and FIG. 4, the main pole 60 extends substantially perpendicularly to the ABS 13 or the surface of the magnetic disk 12. The main pole 60 includes on its side of the magnetic disk 12 a distal end portion 60a which tapers off towards the disk surface. The distal end portion 60a of the main pole 60 is trapezoidal in section, for example. The main pole 60 includes a distal end surface exposed to the ABS 13 of the slider 15. The width of the trailing side end surface 60b of the distal end portion 60a substantially corresponds to that of the tracks on the magnetic disk 12.

The trailing shield 62 is formed of a soft magnetic material, and is arranged at the trailing side of the main pole 60 to effectively close the magnetic path with that part of the soft magnetic layer 102 of the magnetic disk 12 that is directly under the main pole 60. The trailing shield 62 is formed into substantially an L-shape, and includes a first connection portion 50 connected to the main pole 60. The first connecting part 50 is connected through a nonconductive body 52 to the upper part of the main pole 60, which is distant from the ABS 13 of the main pole 60.

The trailing shield 62 includes a distal end portion 62a, which is a slender rectangular parallelepiped. The trailing shield 62 includes a distal end surface exposed to the ABS 13 of the slider 15. The distal end portion 62a includes a leading side end surface 62b, which extends in a width direction of each track of the magnetic disk 12 and also extends substantially perpendicular to the ABS 13. The leading-side end surface 62b is opposed substantially in parallel to the trailing-side end surface 60b of the main pole 60 via a write gap WG.

The first coil 70 is arranged to be wound around a magnetic circuit (the first magnetic core) comprising the main pole 60 and the trailing shield 62. The first coil 70 is wound around the first connecting part 50, for example. When writing a signal to the magnetic disk 12, a recording current is supplied to the first coil 70, and thus the first coil 70 excites the main pole 60 to apply magnetic flux to the main pole 60.

As shown in FIGS. 4 and 5, the STO 65 is provided between the distal end portion 60a of the main pole 60 and the trailing shield 62 in the write gap WG and is partially exposed to the ABS 13. For the STO 65, a symmetrical STO is used, in which two equivalent soft magnetic layers are combined to oscillate by optical mode. That is, the STO 65 comprises a first oscillatory layer (FGL1) 65a made of a magnetic layer, an intermediate layer (non-magnetic conducting layer of, for example, Cu) 65b and a second oscillatory layer (FGL2) 65c made of a magnetic layer, which being placed one upon another in the mentioned order from the main pole 60 side to the trailing shield 62 side. It is desirable that the first oscillatory layer 65a and the second oscillatory layer 65c be formed and processed to have substantially equal magnetic volumes. The first oscillatory layer 65a is joined to the trailing-side end surface 60b of the main pole 60 via a nonmagnetic conductive layer (underlying layer) 66a. The oscillatory layer 65c is joined to the leading-side end surface 62b of the trailing shield 62 via a nonmagnetic conductive layer (cap layer) 66b.

Each of the first oscillatory layer 65a, the intermediate layer 65b and the second oscillatory layer 65c comprises a stack surface or a film surface extending in a direction intersecting with the ABS 13, for example, in a direction perpendicular to the ABS 13. The lower end surface of the STO 65 is exposed to the ABS 13 and is flush with the ABS 13. The width SW of the STO 65 is substantially equal to or less than the track width of the magnetic recording layer 103. The height SH of the STO 65 (the height in a direction perpendicular to the ABS 13) is substantially equal to or less than that of the leading-side end surface 62b of the trailing shield 62.

Note that the lower end surface of the STO 65 may not be flush with the ABS 13 but may be apart above from the ABS 13 in the height direction. Further, the stack surface or film surface of each of the spin injection layer 65a, the intermediate layer 65b and the oscillatory layer 65c may be tilted with respect to the direction perpendicular to the ABS 13.

As shown in FIG. 3, the main pole 60 and the trailing shield 62 are respectively connected to a terminal 91 and a terminal 92 via interconnections. The terminals 91 and 92 are connected through interconnections to the head amplifier IC 30. Thus, a current circuit is formed to supply an STO current serially from the head amplifier IC30 to the main pole 60, the STO 65 and the trailing shield 62.

As shown in FIG. 3 and FIG. 4, the leading shield 64, formed of a soft magnetic material, is provided on the leading side of the main pole 60 to oppose the main pole 60. The leading shield 64 is formed into substantially an L-shape and includes a distal end portion 64a on its magnetic disk 12 side, which is a slender rectangular parallelepiped. The distal end portion 64a has a distal end surface (a lower end surface) exposed to the ABS 13 of the slider 15. The distal end portion 64a includes a trailing side end surface 64b, which extends in a width direction of each track of the magnetic disk 12. The trailing side end surface 64b opposes the leading side end surface of the main pole 60 with a gap therebetween. The gap is filled with a protective insulating film made of nonmagnetic material, which will be explained later.

The leading shield 64 has a second connecting part 68, which is connected to the main pole 60 at a location distant from the magnetic disk 12. The second connecting part 68 is made from a soft magnetic material, for example, and forms a magnetic circuit along with the main pole 60 and the leading shield 64. The second coil 72 of the recording head 58 is wound around a magnetic circuit (the second magnetic core) comprising the main pole 60 and the leading shield 64, to apply a magnetic field to the magnetic circuit. The second coil 72 is wound around the second connecting part 68, for example. Note that a nonconductive material or a nonmagnetic material may be inserted partially into the second connecting part 68.

The second coil 72 is wound around in a direction opposite to the winding direction of the first coil 70. The first coil 70 and the second coil 72 are respectively connected to write current terminals 95 and 96. The write current terminals 95 and 96 are connected through the interconnection to the head amplifier IC 30. The second coil 72 may be serially connected to the first coil 70. The current supply to the first coil 70 and the second coil 72 may be separately controlled. The current supplied to the first coil 70 and the second coil 72 is controlled by the head amplifier IC 30 and the main controller 40.

As shown in FIG. 5, the recording head 58 further comprises a pair of side shields 67 arranged on both sides of the main pole 60 in the width direction, with a gap therebetween on each side. In this embodiment, the side shields 67 are formed as an integral unit with the trailing shield 62 and the leading shield 64, so as to surround the distal end portion 60a of the main pole 60 and the write gap WG.

In the recording head 58 described above, the soft magnetic material used to form the main pole 60, the trailing shield 62, the leading shield 64 and the side shield 67 may be selected from an alloy or compound containing at least one of Fe, Co and Ni.

As shown in FIG. 3, the read head 54 and the recording head 58 are covered with a protective insulating film 76 except for their respective portions exposed to the ABS 13 of the slider 15. The protective insulating film 76 constitutes an outer shape of the head section 17.

The head amplifier IC 30 configured to drive the magnetic heads 16 and the recording head 58, with the above-described structure, comprises, as shown in FIG. 1, a recording current supply circuit 81 configured to supply a recording current through the write current terminals 95 and 96 to the first coil 70 and the second coil 72, an STO current supply circuit 82 configured to supply a driving current to the STO 65 through an interconnection wire (not shown) and the write current terminals 91 and 92, a timing calculator (not shown) to control time and timing of current flow to the recording current supply circuit 81 and the STO current supply circuit 82, a recording current waveform generator (not shown) to generate a recording current waveform in accordance with a recording pattern signal produced in the R/W channel 42, a measurement circuit 84 configured to measure the oscillation characteristics of the STO 65, or more specifically, here, to measure the error rate of data recorded on the magnetic disk 12 to compare, and a switching circuit 83 configured to set an appropriate direction of current flow by switching the flow direction of the STO drive current.

While the HDD 10 is in operation, the main controller 40 causes the driver IC 48 to drive the spindle motor 14 under the control of the MPU 46, thereby rotating the magnetic disk 12 at a predetermined speed. The main controller 40 also causes the driver IC 48 to drive the VCM 22, thereby moving and positioning the magnetic heads 16 to and on a desired track of the magnetic disk 12.

When recording, the recording current supply circuit 81 of the head amplifier IC 30 supplies to the first coil 70 and the second coil 72 the recording signal, which is generated from the R/W channel 42, and the recording current according to the recording pattern. Thus, the first coil 70 and the second coil 72 excite the main pole 60 to produce the recording magnetic field therefrom.

The STO current supply circuit 82 applies a voltage to the main pole 60 and the trailing shield 62 under the control of the MPU 46, causing the driving current to serially pass through the interconnections, the terminals 91, 92, the main pole 60, the STO 65 and the trailing shield 62. In other words, the STO current supply circuit 82 allows the current in a first direction of current flow +i or a second direction of current flow −i, which is opposite, or in the thickness direction of the film of the first oscillatory layer 65a and the second oscillatory layer 65c of the STO 65. With the current flow, the magnetization of the first and second oscillatory layers of the STO 65 is rotated, thereby making it possible to produce a high-frequency magnetic field (microwave). Therefore, the STO 65 applies the microwave magnetic field to the magnetic recording layer 103 of the magnetic disk 12 to decrease the coercive force of the magnetic recording layer 103. In this state, the recording magnetic field is applied from the recording head 58 to the magnetic recording layer 103 to write desired data into the magnetic recording layer 103.

The STO 65 formed of two oscillatory layers (magnetic layers) described above, oscillated by optical mode, has advantages in that the rotating surfaces of microwave fields which contribute to the assist effect are parallel to the recording medium and the microwave fields of the two oscillatory layers reinforce each other therebetween, but the microwave fields on outer sides of the oscillatory layers tend to cancel each other. Therefore, it is desirable that the microwave fields produced by the two oscillatory layers be similar to each other as much as possible. Here, for example, even if the first and second oscillatory layers are formed to have the same thickness, there may be some cases where they do not have the same magnetic volume because of variation in process for individual heads, which takes place later. When the two layers differ in magnetic volume, the oscillating efficiency of the STO is better when the current flows from the oscillatory layer having a larger magnetic volume toward the other one having a smaller magnetic volume. However, which oscillatory layer finally has a greater magnetic volume depends on the dispersion in micro-processing, resulting in variation from one head to another. Therefore, the oscillation characteristics and oscillating efficiency of the STO 65 may vary according to the flow direction of the drive current.

Under these circumstances, according to this embodiment, the HDD 10 comprises the main controller 40 and head amplifier IC 30 have a function to compensate for the dispersion in oscillation characteristics, or more specifically, a function of measuring the oscillating efficiency or characteristics of the STO 65 for each of the first direction of current flow +i and second direction of current flow −i and setting to switch to the direction of current flow to the better oscillating efficiency, i.e., the function which the variation in oscillation characteristics.

Figure 6:
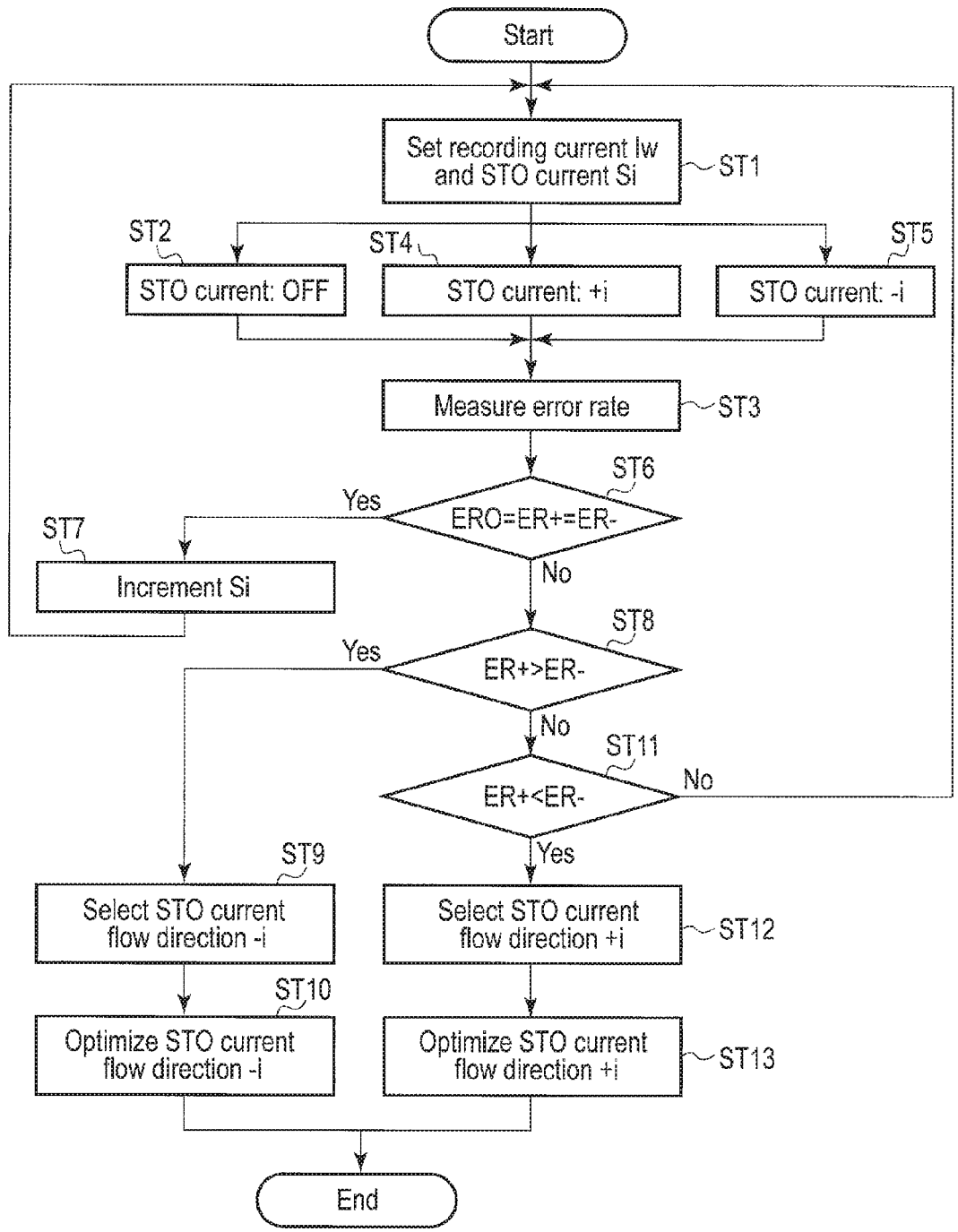
FIG. 6 is a flowchart showing the operation of setting a direction of current flow in the recording head.

FIG. 6 is a flowchart of a drive method (direction of current flow adjustment method) for the magnetic head, that is, the operation for selection and setting of the direction of current flow by the main controller 40 and the head amplifier IC 30. The main controller 40 performs the operation for selection and setting of the direction of current flow at the shipment of the HDD 10 or at each predetermined period.

First, as shown in FIG. 6, the main controller 40 sets a recording current Iw and an STO current Si for inspection (ST1), and records a recording signal on a magnetic disk under three conditions. The first condition is that after recording a signal on the magnetic disk 12 by the record current Iw while the STO current Si is in an off state (zero state) (ST2), the error rate ER0 of the recorded signal is measured by the measurement circuit 84 of the head amplifier IC30 (ST3). The second condition is that while the flow direction of the STO current Si is set to the first direction of current flow +i (positive direction, that is, the direction of flow from the main pole 64 to the trailing shield 62 through the STO 65, for example), the STO current Si and the recording current Iw are supplied to record a signal on the magnetic disk 12 (ST4), and then the error rate ER+ of the recorded signal is measured by the measurement circuit 84 (ST3). The third condition is that while the flow direction of the STO current Si is set to the second direction of current flow −i, which is opposite (negative direction, that is, the direction of flow from the trailing shield 62 to the main pole 60 through the STO 65, for example), the STO current Si and the recording current Iw are supplied to record a signal on the magnetic disk 12 (ST5), and then the error rate ER− of the recorded signal is measured by the measurement circuit 84 (ST3).

Subsequently, the error rates ER0, ER+ and ER− measured by the measurement circuit 84 are compared with each other (ST6). When the error rates are equal to each other (ER0=ER+=ER−), that is, the error rate does not change regardless of whether the current is supplied to the STO or not, the main controller 40 determines that that the absolute value of the inspection current Si of the STO 65 is short and increases the value of the inspection current Si (ST7). Then, Steps ST2 to ST5 described above are repeatedly performed.

When the result of the comparison indicates that the error rate ER− is lower than the error rate ER+ (ST8), the switching circuit 83 selects the second direction of current flow −i with a lower error rate, that is, a better oscillating efficiency of the STO 65, and switch the flow direction of the STO current-supply circuit 82, thus setting the current direction to the second direction of current flow −i (ST9). Further, the main controller 40 optimizes the current value of the STO current Si set in the second direction of current flow −i to a value suitable for recording operation (ST10).

On the other hand, when the result of the comparison indicates that the error rate ER+ is lower than the error rate ER− (ST11), the switching circuit 83 selects the first direction of current flow +i with a lower error rate, that is, a better oscillating efficiency of the STO 65, and switch the flow direction of the STO current-supply circuit 82, thus setting the current direction to the first direction of current flow +i (ST12). Further, the main controller 40 optimizes the current value of the STO current Si set in the second direction of current flow +i to a value suitable for recording operation (ST13). Thus, the main controller 40 finishes the operation if selection and setting of the direction of current flow.

As described above, the optimal direction of current flow can be set for each magnetic head by selecting the direction of current flow which results in a better oscillating efficiency of the STO 65 based on the degree of the error rate, for example. In this manner, the oscillating efficiency of the STO 65 can be improved and the microwave assist effect and the reduction of the conducting current can be optimized.

Embodiment

Figure 7:
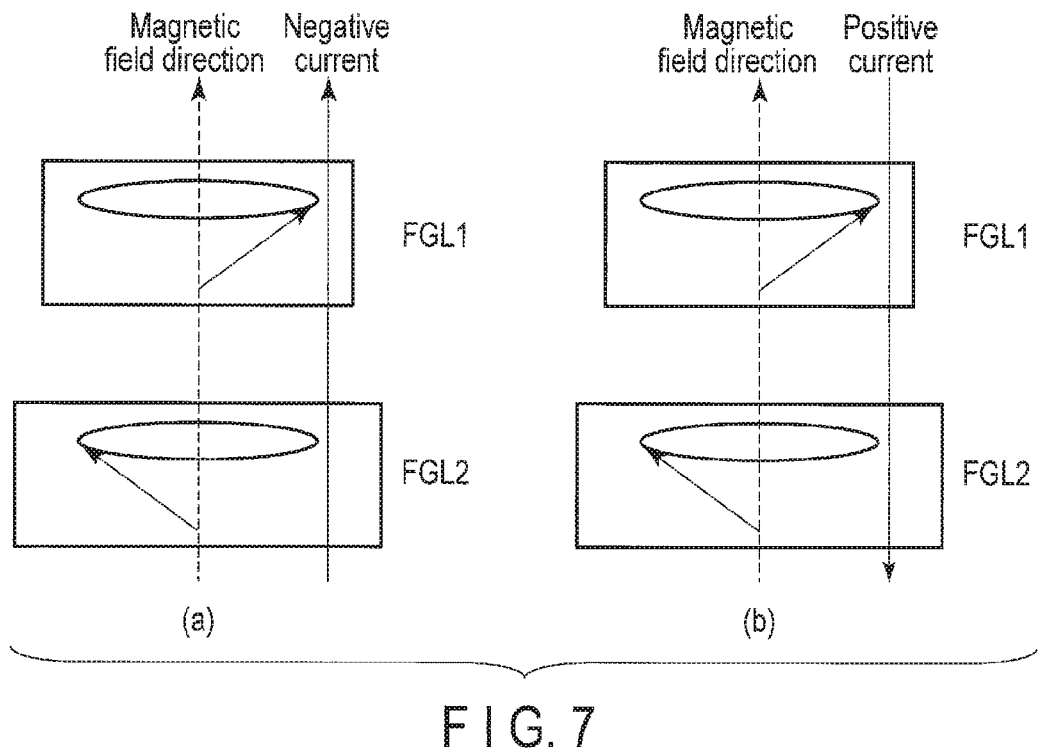
FIG. 7 is a plan view schematically showing an oscillatory layer and a direction of current flow of the STO according to the embodiment.
Figure 8:
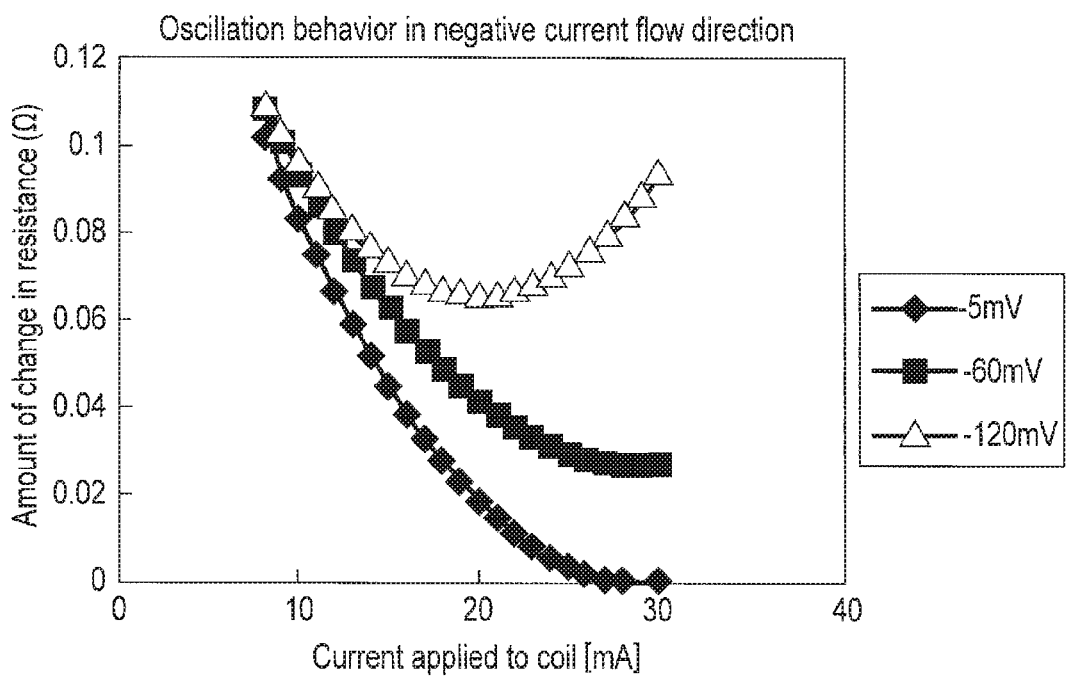
FIG. 8 is a diagram showing the oscillation behavior of the STO of the embodiment when the electricity is supplied thereto in a negative direction of current flow.

FIG. 7 is a plan view schematically showing the oscillatory layer of the STO according to an embodiment and its direction of current flow. FIG. 8 is a diagram showing an oscillation behavior of the STO when the current flows in a negative direction of current flow to the STO according to the embodiment. FIG. 8 is a diagram showing an oscillation behavior of the STO when the current flows in a positive direction of current flow to the STO according to the embodiment.

A spin torque oscillator (STO) was prepared, which comprises the first oscillatory layer (FGL1) and the second oscillatory layer (FGL2) provided between the main pole of the magnetic head and the write shield. The layered structure of the STO was Ta (3 nm)/Cu (2 nm)/Fe45Co45Al10 atomic % (10 nm) (FGL1)/Cu (2 nm) (intermediate layer)/Fe45Co45Al10 atomic %(10 nm) (FGL2)/Ru (5 nm). By ion milling, the STO was patterned into a quadrangle one side of which was about 40 nm. The magnetic head was measured in terms of the oscillation characteristics of the STO while a signal-write magnetic field was being produced by supplying the recording current to the coil of the main pole.

Figure 9:
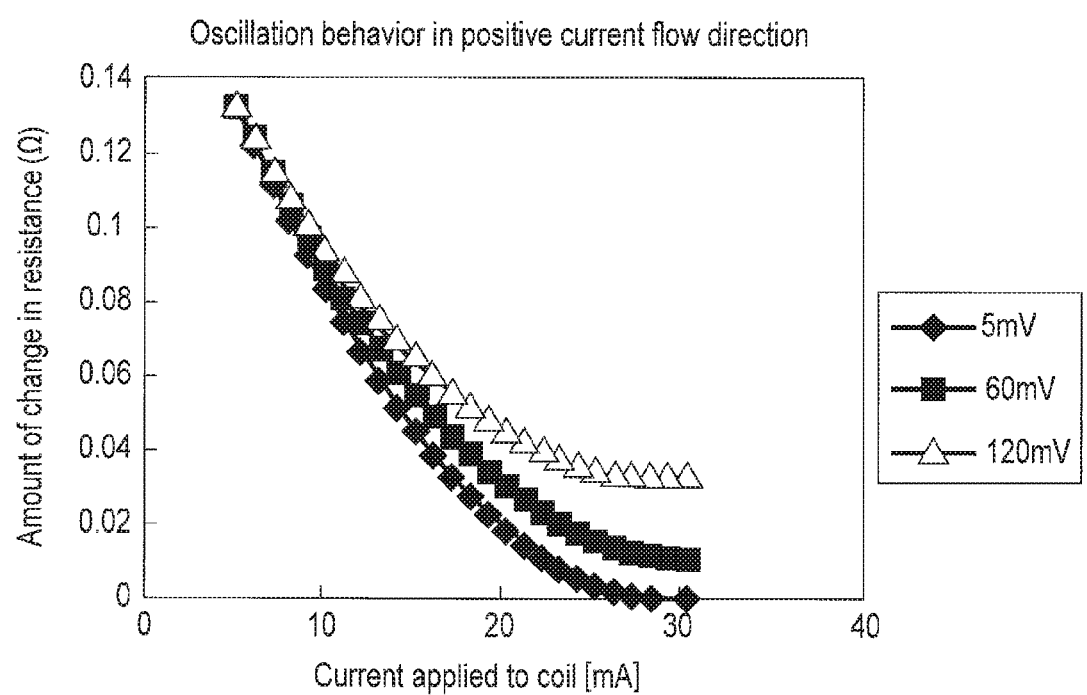
FIG. 9 is a diagram showing the oscillation behavior of the STO of the embodiment when the electricity is supplied thereto in a positive direction of current flow.

FIG. 8 shows the relationship between the current supplied to the coil and the change in resistance of the STO when the current is supplied to the STO in the negative direction of current flow at three different application voltages, as shown in FIG. 7 (a). FIG. 9 shows the relationship between the current supplied to the coil and the change in resistance of the STO when the current is supplied to the STO in the positive direction of current flow at three different application voltages, as shown in FIG. 7 (b).

It can be understood from FIGS. 8 and 9 that in the oscillation characteristics and the oscillating efficiency of the STO were improved by supplying the current in an appropriate flow direction. More specifically, as shown in FIG. 9, in the case of the positive direction of current flow, the change in resistance is small at any voltage and decreases substantially in proportion to the current applied to the coil. On the other hand, as shown in FIG. 8, in the case of the negative direction of current flow, the rise of the change in resistance resulting from the magnetization rotation by the STO is exhibited more significantly. That is, it can be understood that the oscillating efficiency of the STO was improved.

The shape of the STO was observed under cross-sectional electron microscope, and it was found that the volume of the second oscillatory layer (FGL2) was greater than that of the first oscillatory layer (FGL1). It was further found that the polarity appeared in the degree of the oscillating efficiency of the STO when the oscillatory layers differ in magnetic volume. That is, the oscillating efficiency of the STO improves if the negative direction of current flow is set.

According to this embodiment structured as above, the microwave assist magnetic disk device uses an STO oscillating by optical mode, can avoid the shortage of the assist effect resulting from an STO oscillation error due to the dispersion in processing of magnetic head, and thus the yield can be improved. In this manner, it is possible to provide a disk device which can improve the oscillating efficiency of a microwave oscillator and a method of driving (adjusting) a magnetic head.

The adjustment of the direction of current flow of the STO drive current described above should desirably be carried out before the adjustment of set items which may be influenced by recording capability in the initial setting of the HDD, since it may influence the recording performance of a recording head. Of the initial setting items, the following five items are adjusted.

1) adjustment of head flying; 2) adjustment of recording/reproduction location offset; 3) adjustment of signal-processing parameter; 4) optimization adjustment of linear recording density and track pitch; and 5) environmental temperature test The above setting operations are carried out in the order shown.

The adjustment of the STO direction of current flow is carried out before setting items, but it is not always necessary to carry out the adjustment just before each of the items. It is desirable that the adjustment of the STO direction of current flow is performed before the adjustment of the signal processing parameter, which is the setting affecting the final recording performance. On the other hand, as to the adjustment of head floating, when thermal expansion is utilized using a heater, the STO also expands in volume. Therefore, the oscillation behavior of the STO may be affected depending on the temperature set to the heater. For this reason, it is desirable to adjust the STO current direction after the adjustment of head floating.

In the optimization of the track pitch, the STO may be affected by the thermal expansion to some extent since the optimization is carried out based on the magnitude of the coil current supplied to the recording head. Therefore, it is desirable to carry out the adjustment of the STO direction of current flow once again after the optimization of the linear recording density and the track pitch. Moreover, the environmental temperature test may also be affected by the thermal expansion to some extent. Therefore, it is desirable to carry out the adjustment of the STO direction of current flow once again after the environmental temperature test.

In the HDD, the magnetic head may collide with the recording medium during use, causing some strain in the magnetic head. In this case, the STO may as well be deformed or strained. Therefore, while using the HDD, it is desirable to adjust the STO direction of current flow after an elapse of a predetermined time or when the number of occurrences of errors increases. For example, in the confirmation of recording quality, carried out immediately after the recording, when errors are detected more than a predetermined number of times, it may be able to recover the recording capability by adjusting the STO direction of current flow.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the location of the microwave oscillator is not limited to the trailing side of the main pole, but it may be the leading side of the main pole. The recording head is not limited to the double-core structure including a trailing shield and a leading shield, but it may include either one of them.

As described above, the adjustment and setting of the STO direction of current flow may be used functionalized not only for the initial setting of the HDD, but also for the reversal of magnetization stability which may occur because of the aging of the STO in operation. That is, when a predetermined use time elapsed, the optimization of the direction of current flow by the sequence shown in FIG. 7 should be carried out once again. In this manner, the HDD can be used always with the direction of current flow which exhibits the optimal assist effect.

What is claimed is:

1. A disk device comprising:
   a disk comprising a recording layer;
   a recording head comprising a main pole configured to apply a recording magnetic field onto the recording layer, and a microwave oscillator adjacent to the main pole, configured to apply a microwave magnetic field to the recording layer;
   a current supply circuit configured to supply a current to the microwave oscillator;
   a switching circuit configured to switch a direction of current flow to the microwave oscillator; and
   a measurement circuit configured to measure first oscillation characteristics of the microwave oscillator when a current is supplied to the microwave oscillator in a first direction of current flow, to measure second oscillation characteristics of the microwave oscillator when a current is supplied to the microwave oscillator in a second direction of current flow, and to compare the measured first and second oscillation characteristics, and
   wherein the switching circuit is configured to select and switch to the first direction of current flow or the second direction of current flow, with which better oscillation characteristics of the microwave oscillator can be obtained.

2. The disk device of claim 1, wherein
   the microwave oscillator comprises a first oscillatory layer, and a second oscillatory layer stacked on the first oscillatory layer via an intermediate layer.

3. The disk device of claim 2, wherein
the recording head comprises an air bearing surface opposing the recording layer, and the first oscillatory layer and the second oscillatory layer each comprise a stack layer surface extending in a direction intersecting the air bearing surface.

4. The disk device of claim 1, wherein the measurement circuit is configured to measure an error rate of a signal recorded on the recording layer by the main pole while supplying a current to the microwave oscillator in the first direction of current flow, and an error rate of a signal recorded on the recording layer by the main pole while supplying a current to the microwave oscillator in the second direction of current flow, and to compare the error rates with each other, and
wherein the switching circuit is configured to select and switch to the first current flow direction or the second current flow direction, with which a lower error rate is measured.

5. The disk device of claim 1, wherein the recording head comprises a write shield opposing the main pole via a write gap therebetween, and connection terminals electrically connected to the main pole and the write shield, respectively, and the microwave oscillator is located within the write gap and electrically connected to the main pole and the write shield via a conductive layer.

6. A method of driving a recording head comprising a main pole configured to apply a recording magnetic field and a microwave oscillator configured to apply a microwave magnetic field, the method comprising:

measuring first oscillation characteristics of the microwave oscillator when a current is supplied to the microwave oscillator in a first direction of current flow and measuring second oscillation characteristics of the microwave oscillator when a current is supplied to the microwave oscillator in a second direction of current flow;

comparing the measured first and second oscillation characteristics; and selecting the first direction of current flow or the second direction of current flow, with which better oscillation characteristics of the microwave oscillator can be obtained, and switching to the selected direction.

7. The method of claim 6, further comprising:

measuring a first error rate of recording data recorded by the main pole while supplying a current to the microwave oscillator in the first direction of current flow, and measuring a second error rate of recording data recorded by the main pole while supplying a current to the microwave oscillator in the second direction of current flow, which is opposite to the first direction of current flow; and comparing the first error rate and the second error rate with each other, selecting a current flow direction, with which a lower error rate is measured, and switching to the selected direction of current flow to the microwave oscillator between the first direction of current flow and the second direction of current flow.

* * * * *